UNITED STATES PATENT OFFICE.

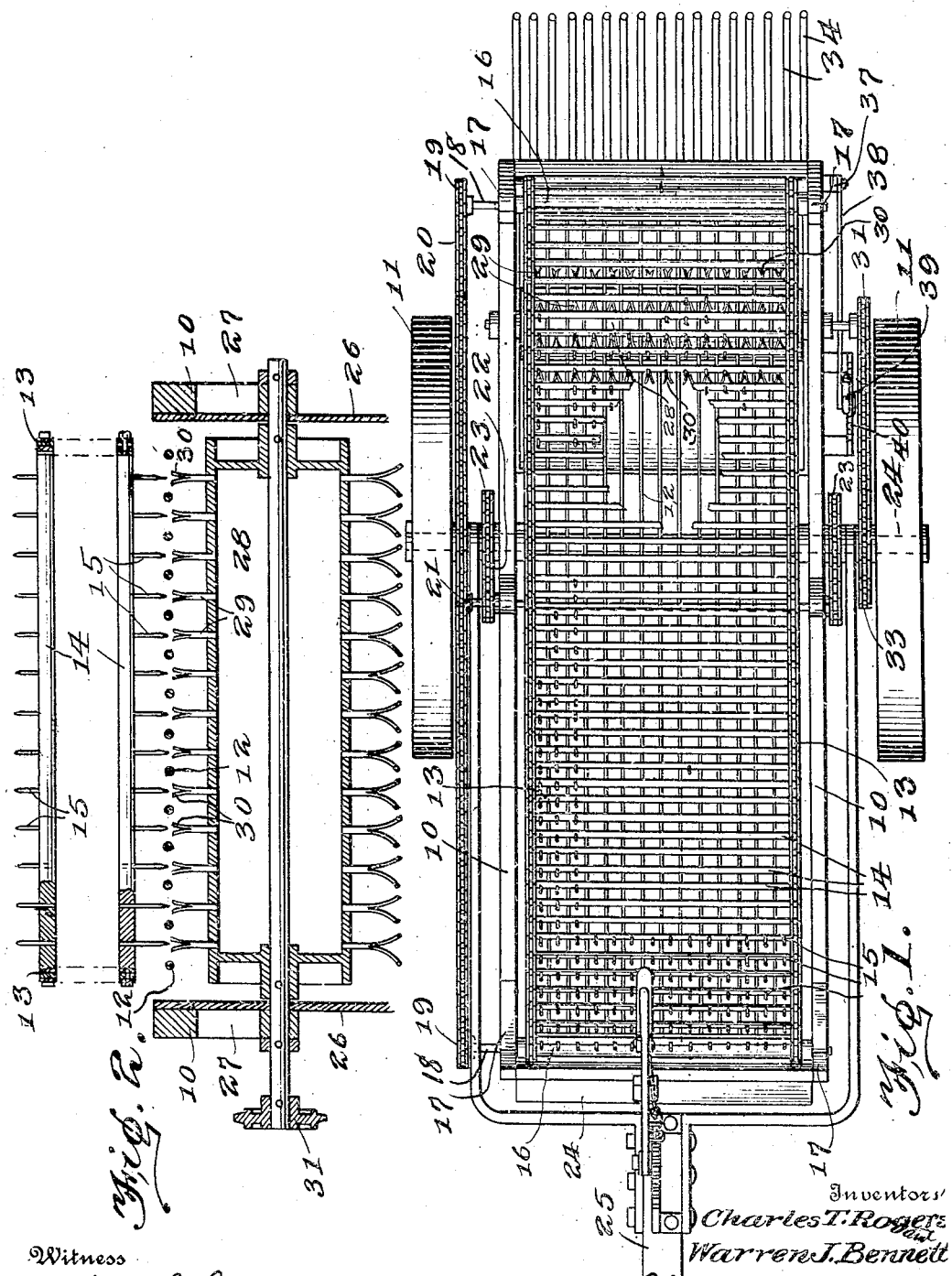

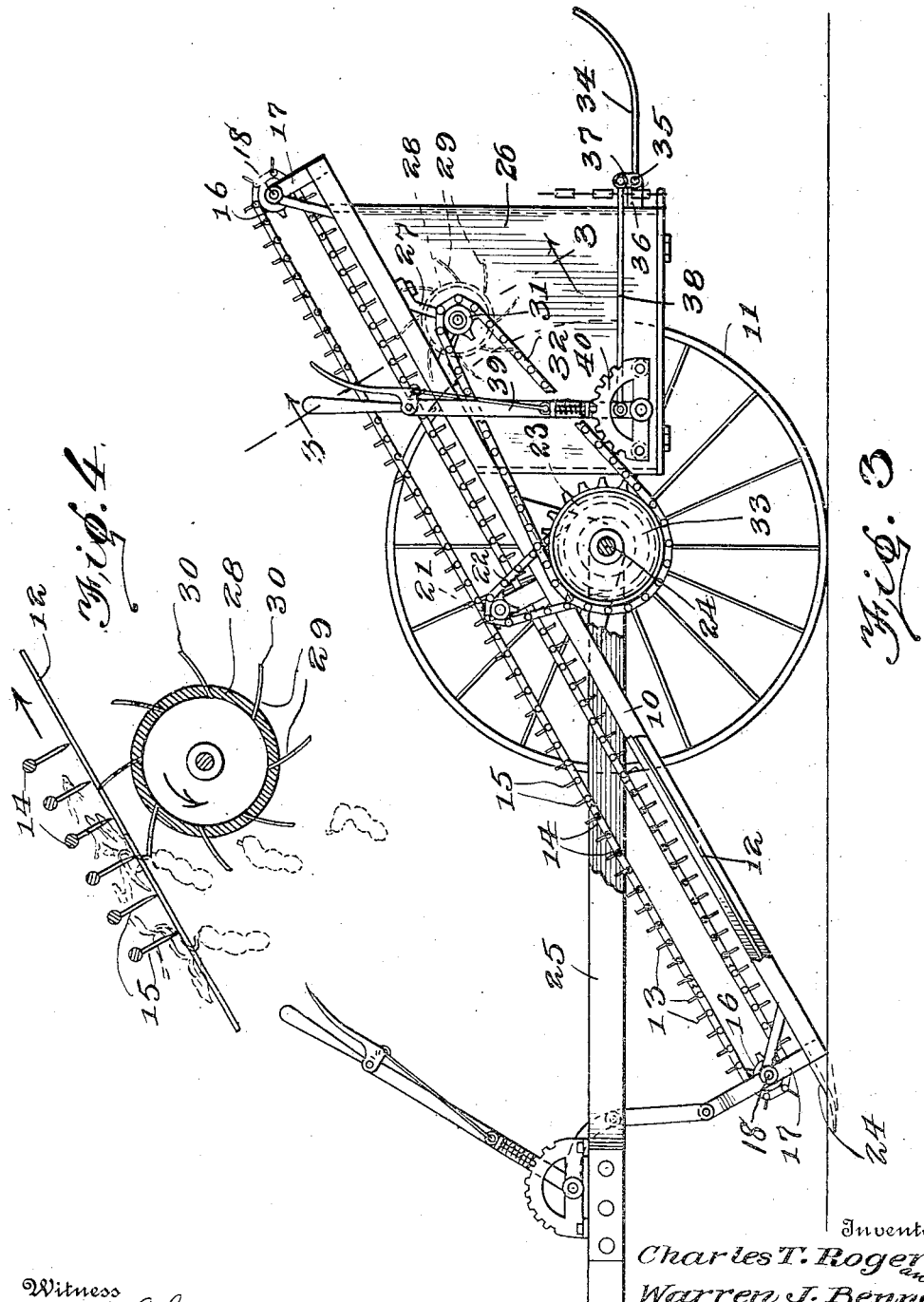

CHARLES T. ROGERS AND WARREN J. BENNETT, OF NEWTON, ALABAMA.

PEANUT-HARVESTER.

1,251,425.   Specification of Letters Patent.   Patented Dec. 25, 1917.

Application filed December 22, 1916. Serial No. 138,449.

*To all whom it may concern:*

Be it known that we, CHARLES T. ROGERS and WARREN J. BENNETT, citizens of the United States, residing at Newton, in the county of Dale and State of Alabama, have invented new and useful Improvements in Peanut-Harvesters, of which the following is a specification.

This invention comprehends the provision of a peanut harvesting machine, designed to separate the peanuts from the vines, subsequent to plowing the latter from the ground, and discharging the peanuts, free from dirt or other foreign matter into a receptacle supported by the frame.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and wherein:—

Figure 1 is a top plan view of the machine constructed in accordance with our invention.

Fig. 2 is a transverse sectional view looking in the direction of the arrow and taken on line 3—3 of Fig. 3.

Fig. 3 is a side elevation partly in section.

Fig. 4 is an enlarged detail view of the picker drum.

A machine constructed in accordance with our invention embodies a substantially rectangular elongated frame 10, which is mounted upon the wheels 11 and supported at an inclination to the ground or surface. The frame includes a plurality of longitudinally extending bars 12 disposed in spaced relation, and above which an endless conveyer is adapted to travel. The conveyer preferably consists of a pair of spaced endless chains 13 connected together by means of a series of transverse bars or strips 14, from one side of which latter project a plurality of teeth 15 which are disposed at an angle with respect thereto. The endless conveyer is trained over rollers 16 journaled for rotation at the opposite ends of the frame 10 in suitable brackets 17 which support the rollers an appropriate distance above the frame. The shaft 18 of each roller projects an appreciable distance beyond one side of the frame and has fixed thereon a sprocket wheel 19 over which is trained an endless chain 20. The chain 20 is driven by means of a sprocket wheel 21 arranged to engage the upper run of the chain 20, and which sprocket wheel 21 is rotated as the machine travels over the ground or surface, a chain 22 being trained over the sprocket 21 and also over a sprocket 23 which latter may be mounted either upon the axle 24 or the hub of the wheel 11. Manifestly the endless conveyer is driven from the wheel or axle of the machine when the latter is in operation. Projecting forwardly of the frame 10 and secured thereto in any suitable manner is a plow blade 24 which is disposed at the proper angle to the horizontal for plowing or removing the vines from the ground as the machine is moved thereover. It might here be stated that the machine can be propelled in any suitable manner and is provided with a tongue 25.

Depending from the frame 10 adjacent its rear or uppermost end is a receptacle 26 adapted to receive the peanuts when the latter are separated from the vines by means to be presently described. Depending from the sides of the frame 10 are brackets 27 between which a cylinder 28 is journaled and disposed within the receptacle 26. Radiating from the cylinder is a plurality of fingers 29 disposed in staggered relation and provided with forked terminals as at 30 so that the peanuts will be positively removed from the vines as the latter are carried past the receptacle to be discharged upon the ground from the rear end of the machine. It is of course to be understood that the machine can be used with or without the receptacle 26 and the mechanism for separating the peanuts from the vine, in which instance the harvester would merely plow up the vines and discharge the same in piles along the ground without separating the peanuts therefrom.

In practice the machine is drawn over the ground or surface with the plow blade 24 functioning to remove the vines from the ground. As the vines are removed the teeth 15 of the endless conveyer obtain an effective purchase upon the same, and carry the vines between the lower run of the conveyer and the frame upwardly in the direction of the receptacle 26. The rods 12 are spaced an appropriate distance to permit the peanuts to depend between these rods so that they will be positively removed from the vines through the instrumentality of the forked fingers 29 of the cylinder 28. The shaft of the cylinder 28 has secured to one end thereof a gear wheel 31 over which is trained a chain 32, which latter also passes over a gear wheel 33 on the axle 24 whereby a rotary motion is imparted to the cylinder 28 when the machine is in motion. Manifestly as the vines are being carried up the frame, dirt and other foreign matter is permitted to fall between the rods to the ground, and as the vines pass above the receptacle 26 the peanuts by reason of the construction disclosed are separated from the vine and deposited within the receptacle 26 free from dirt or other foreign matter, while the vines continue upwardly in their travel upon the frame to be discharged from the uppermost end thereof onto the ground or other surface.

Instead of having the vines discharged directly upon the ground or surface from the uppermost end of the machine, it may be desirable to arrange these vines in piles or bunches upon the ground at spaced intervals. For this purpose the invention provides a rack 34 of any suitable construction, which is pivotally mounted at the rear of the receptacle 26, being normally disposed horizontally and of proper proportions to receive the vines or the like which are discharged from the uppermost end of the machine. The rack is pivotally mounted as at 35 upon a suitable bracket 36, and fixed upon the pivot 35 is a link 37 connected with the adjacent extremity of a reciprocating rod 38, the opposite extremity of the latter being connected with a hand operated lever 39. Manifestly, through the instrumentality of the lever 39 the rack 34 can be swung upon its pivot when it is desired to deposit upon the ground or surface, in a pile or bundle, the vines collected upon the rack. A segmental rack 40 is arranged in juxta-position to the lever 39 and a spring actuated dog forming part of the lever coöperates with the teeth of the segmental rack, to hold the rack 34 fixed normally in its horizontal position, or at any desired inclination in its adjusted position. While the rack may be of any desired construction, it preferably embodies a plurality of spaced parallel arms the free extremities of which are curved upwardly to prevent the vines from falling from the rack when they are deposited thereon from the endless conveyer.

It is believed that from the foregoing description the nature and advantages of the invention will be readily apparent without requiring a more extended explanation and therefore the same has been omitted. However we desire to have it understood that what is herein shown and described is merely illustrative of the preferred embodiment of the invention to which we do not limit ourselves and that such changes may be resorted to when desired as fall within the scope of what is claimed.

What is claimed is:—

1. A peanut harvesting machine embodying a wheeled frame, having a plurality of spaced parallel rods, a roller journaled upon each end of the frame above said rods, a plow blade projecting from the frame adjacent the forward end thereof, an endless toothed conveyer trained over said rollers, means for driving said conveyer, and means for separating the peanuts from the vines as the latter are carried by said conveyer along said frame.

2. A peanut harvesting machine embodying a wheeled frame having a plurality of spaced parallel rods, a roller journaled upon each end of the frame above said rods, an endless toothed conveyer trained over said rollers, gear wheels mounted upon the corresponding extremities of said rollers at one side of the frame, a chain trained over said gear wheels, means for driving said chain from the wheels of the machine to rotate said rollers, a plow blade projecting from the forward end of said frame, a receptacle depending from the frame adjacent the opposite end thereof, and means for separating the peanuts from the vines as the latter are carried by said endless conveyer across said receptacle.

3. A peanut harvesting machine embodying a wheeled frame having a plurality of spaced parallel rods, a roller journaled upon each end of the frame above said rods, an endless toothed conveyer trained over said rollers, means for driving said conveyer from said wheels, a plow blade projecting from the forward end of the frame, a receptacle depending from the frame adjacent the opposite end thereof, and picker arms arranged within the receptacle for separating the peanuts from the vines as the latter are conveyed over the frame and across the receptacle.

4. A peanut harvesting machine embodying a wheeled frame having a plurality of spaced parallel rods, a roller journaled upon each end of the frame above said rods, an endless toothed conveyer trained over said rollers, means for driving said conveyer from said wheels, a plow blade projecting from the forward end of the frame, a receptacle depending from the frame adjacent the opposite end thereof, a cylinder rotatably mounted within the receptacle, means for rotating the cylinder simultaneously with the travel of the machine, and picker arms projecting from said cylinder for separating the peanuts from the vines as the latter are carried over the frame across said receptacle.

5. A peanut harvesting machine embodying a wheeled frame having a plurality of spaced parallel rods, a roller journaled upon each end of the frame above said rods, an endless toothed conveyer trained over said rollers, means for driving said conveyer as the machine is moved over the surface, a plow blade projecting from the forward end of the frame, a receptacle depending from the frame adjacent the opposite end thereof, a cylinder mounted within the receptacle for rotation, and picker fingers projecting from said cylinder for separating the peanuts from the vine as the latter are carried over the frame across said receptacle, each of said fingers having a forked extremity.

6. A peanut harvesting machine embodying a wheeled frame, an endless toothed conveyer movable along the frame, means for driving the conveyer, a receptacle, and means for separating the peanuts from the vines as the latter are carried by the conveyer across said receptacle.

7. A peanut harvesting machine embodying a wheeled frame, an endless toothed conveyer movable along the frame, means for driving said conveyer, a receptacle supported by the frame, and means actuated simultaneously with the travel of the machine, for separating the peanuts from the vines at a point immediately above the receptacle.

In testimony whereof we affix our signatures.

CHARLES T. ROGERS.
WARREN J. BENNETT.

Copies of this patent may be obtained for five cents each, by addressing the "Commissioner of Patents, Washington, D. C."